United States Patent [19]

Studer

[11] 4,444,457
[45] Apr. 24, 1984

[54] PROCESS AND DEVICE FOR THE PRODUCTION OF A TELECENTRIC LIGHT BEAM AND USE OF THE PROCESS

[75] Inventor: Urs-Peter Studer, Riehen, Switzerland

[73] Assignee: Zumbach Electronic AG, Orpund, Switzerland

[21] Appl. No.: 381,520

[22] Filed: May 24, 1982

[30] Foreign Application Priority Data

Jun. 4, 1981 [CH] Switzerland ............ 3671/81

[51] Int. Cl.³ .................................................. G02B 27/17
[52] U.S. Cl. ............................................ 350/6.8; 356/387
[58] Field of Search .......................... 350/6.8, 6.7, 486; 356/386, 387

[56] References Cited

U.S. PATENT DOCUMENTS 3,829,220  8/1974  Parkinson ........................... 356/387
4,264,141  4/1981  Guers et al. ........................ 350/486
4,402,575  9/1983  Jacobs ............................... 350/486

*Primary Examiner*—John K. Corbin
*Assistant Examiner*—Rebecca D. Gass
*Attorney, Agent, or Firm*—Bruno Zumbach

[57] ABSTRACT

In a device for the production of a telecentric light beam which is to be deflected over a defined region an incident light beam impinges upon a rotating plane mirror. The light beam reflected thereby reaches the outlet of the device by way of a further co-rotating parallel plane mirror as a telecentric light beam. There is thus obtained by simple optical means a deflection over a region which is considerable in comparison with the dimensions of the device, and the shifting of the deflected light beam occurs according to a simple mathematical function, more especially a sine function. This simple mathematical relationship of a rotary angle and a displacement of the light beam enables an especially simple evaluation of measurement data.

15 Claims, 6 Drawing Figures

4,444,457

PROCESS AND DEVICE FOR THE PRODUCTION OF A TELECENTRIC LIGHT BEAM AND USE OF THE PROCESS

BACKGROUND OF THE INVENTION

The present invention concerns a device for the production of a telecentric light beam, which is to be deflected parallel to itself through a defined region.

SUMMARY OF THE INVENTION

It is an object of the invention to obtain by simple and proportionately smaller means measurements of a deflection of the light beam across a considerable range.

The invention accordingly provides a device for the production of at least one telecentric light beam, which is to be deflected parallel to itself through a defined region, said device comprising at least one pair of plane parallel internal mirrors arranged on a rotatably supported carrier, the arrangement being such that the optical axis of a light beam from a light source is inclined to the plane of rotation of the carrier and the mirrors, and the carrier being supported on one side of the mirrors and comprising on that side windows for the passage of the light beam, whilst being open on the other side, whereby the passage of the light beam can occur laterally of the mirrors.

It is a further object of the invention to enable a simple measuring process to be effected by use of a device according to the invention.

The invention accordingly further provides such a process, wherein the object is brought into the said region, there is ascertained at which point in time or at which angular position of the rotatable mirror the light beam is located on at least one predetermined point of the object, and a calculator is utilised to determine from the or each said point in time or angular position, in accordance with a simple function, the position of the light beam when located on said predetermined point or points, and thus the dimension and/or the position of said object.

DETAILED DESCRIPTION OF PREFERRED EMBODIMENTS

Figure 1:
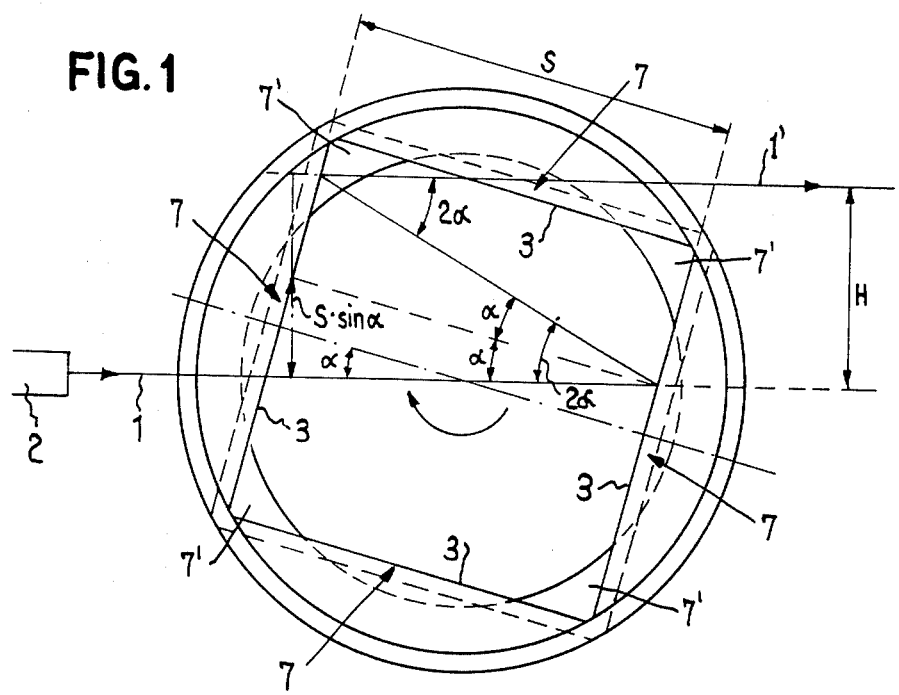
FIG. 1 shows a front view of one embodiment of device in accordance with the invention.
Figure 2:
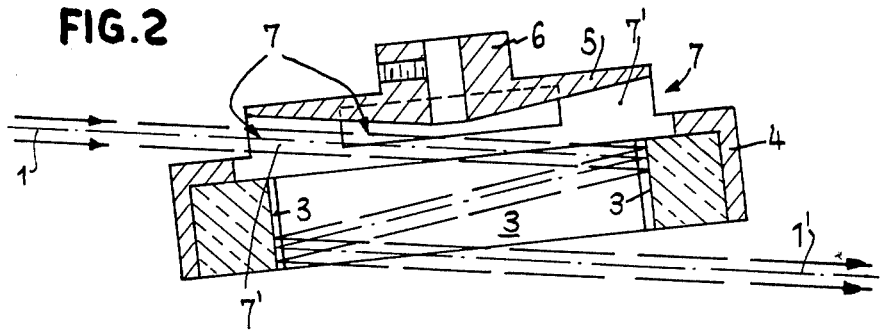
FIG. 2 shows an axial cross-section of the arrangement of FIG. 1, and FIGS. 3 to 6 show examples of use of the device according to FIGS. 1 to 2.

FIG. 1 shows an entering light beam 1 from a laser 2, which is to be deflected as a telecentric exiting light beam 1' with a displacement H relatively to the optical axis of the entering light beam 1. The deflection is achieved by means of a rotating mirror system of square shape. The spacing of each two oppositely disposed parallel mirror faces 3 corresponds to the dimension S. The rotatable mirrors 3 are set in a ring 4 which is formed integrally with a flange 5 and a hub 6. The parts 4 to 6 form a carrier for the mirrors 3. The hub 6 is connected with a shaft not shown, which can be driven at an exactly defined angular velocity, for example by means of a synchronous or stepping motor. Such drivers are known and do not form part of the present invention. The carrier formed of the parts 4, 5 and 6 comprises between the parts 4 and 5 four milled portions at right angles in the regions of which there are slot-shaped windows 7 between webs 7', through which the incident beam 1 can enter as shown in FIG. 2. The axis of the carrier 4, 5, 6 is inclined relatively to the optical axis of the incident light beam 1 and the reflected light beam 1', and the mirror surfaces 3 comprise a corresponding inclination. There is thus provided a zig-zag shaped ray path, as shown in FIG. 2, wherein the light beam is respectively reflected at two oppositely facing mirror surfaces 3. The manner of this reflection is illustrated in FIG. 1. From this Figure it will be seen that for a defined angle of rotation of the mirror system from a zero position, in which two mirrors are arranged at right angles to and two mirrors parallel to the optical axis of the incident and reflected light beam, the incident light beam is reflected by an angle $2\alpha$ at the backwardly facing mirror surface and then also at the likewise backwardly facing mirror surface is reflected by the same angle $2\alpha$. It thus always exits exactly parallel to the axis of the entering light beam and becomes displaced during continuous rotation of the mirror surfaces, for example in the clockwise direction indicated by the arrow in FIG. 1 being brought from below to above. As will also be apparent from FIG. 1, the deflection can be expressed as $$H = 2S \cdot \sin \alpha$$

wherein S corresponds to the distance between the oppositely arranged mirror surfaces 3.

From the preceding description it will be immediately apparent that the device according to FIGS. 1 and 2 is formed from very simple elements, in particular plane mirrors, and that by these simple means shifting of the exiting light beam occurs according to a very simple mathematical function. This mathematical dependence is very exact providing that simply fulfilled conditions are maintained, that is to say that the rotary axis of the rotary mirror system lies in the optical axis of the incident beam 1, that the mirror surfaces are arranged exactly symmetrical to this axis and parallel, and that the rotary angle of the mirror system can be exactly determined.

An essential advantage of the embodiment according to FIGS. 1 and 2 is that a mirror system is symmetrical about the rotary axis and thus is practically balanced. A similarly symmetrical system would also be achieved if only two or more than four mirror surfaces were present in a desired polygonal arrangement. The example with two or four mirrors has the advantage, however, in relation to possible systems with more mirror surfaces, that the amplitude of the deflected telecentric light beam or pencil of light rays is a maximum in relation to given measurements of the mirror system.

A further arrangement would be possible in that one mirror 3 according to FIG. 1 could be arranged opposite to a plane mirror surface located on the rotary axis of the mirror system. The light beam would be deflected by such a mirror in a similar manner as in the illustrated mirror system, but the total lateral deflection would be only half as great, and it would be necessary to balance the rotating mirror system.

Figure 3:
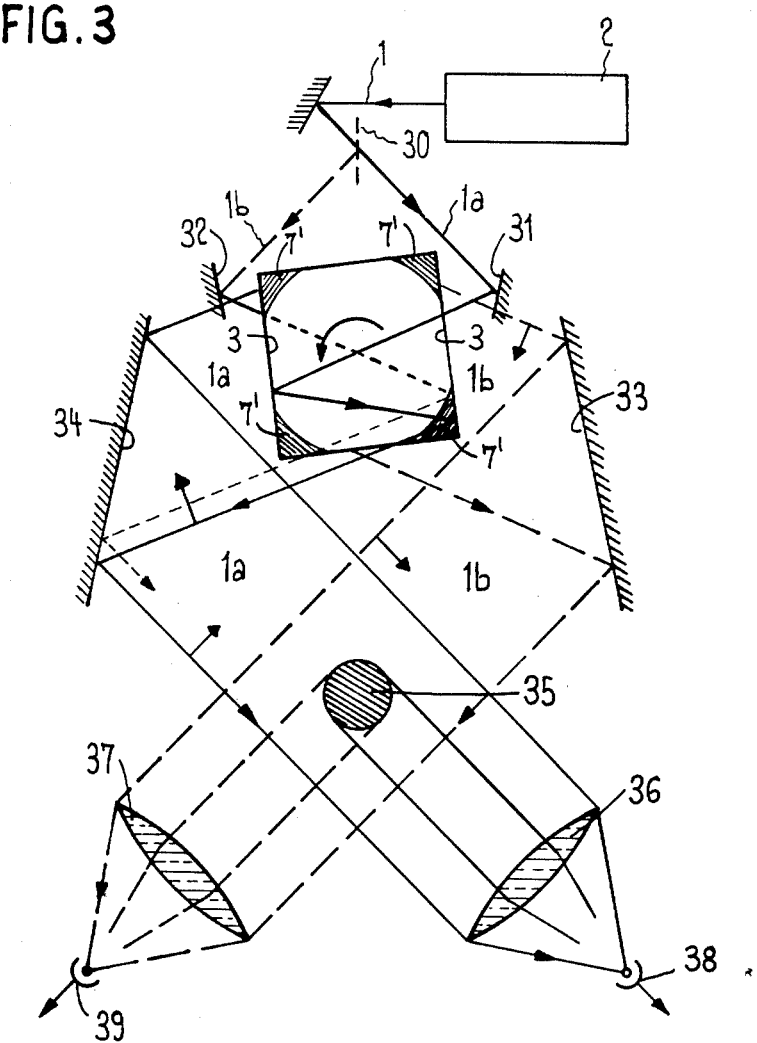

FIG. 3 shows in diagrammatic form one example of use wherein further mirrors are provided for the production of telecentric beams in the directions of two optical axes arranged at right angles to one another. Corresponding parts are indicated by the same reference numerals as in FIGS. 1 and 2. The light beam of the light source 2 is split into two beams 1a and 1b by means of a half reflecting mirror 30, the beams 1a and 1b being conducted to the square rotatable mirror system 3 by way of further mirrors 31 and 32. From there they pass via further mirrors 33 and 34 to a measuring region in which is located an object 35 to be measured. The telecentric beams 1a and 1b extend at right angles to one another in the measuring region and in this manner make it possible for two dimensions of the object 35 to be determined. The light rays are condensed onto photocells or diodes 38 and 39 by means of lenses 36 and 37, the diodes providing electrical signals for evaluation by the above-mentioned calculating device. The angular positions in which the mirror system 3 is located at the instant of occlusion and unblocking of the light beam are respectively determined and it can then be determined with the aid of the simple stored sine function at which points relatively to the optical axis the occlusion and unblocking took place. By this means a measurement and/or a position of the object can be determined. Arrows indicate the direction of movement of the beams.

Figure 4:
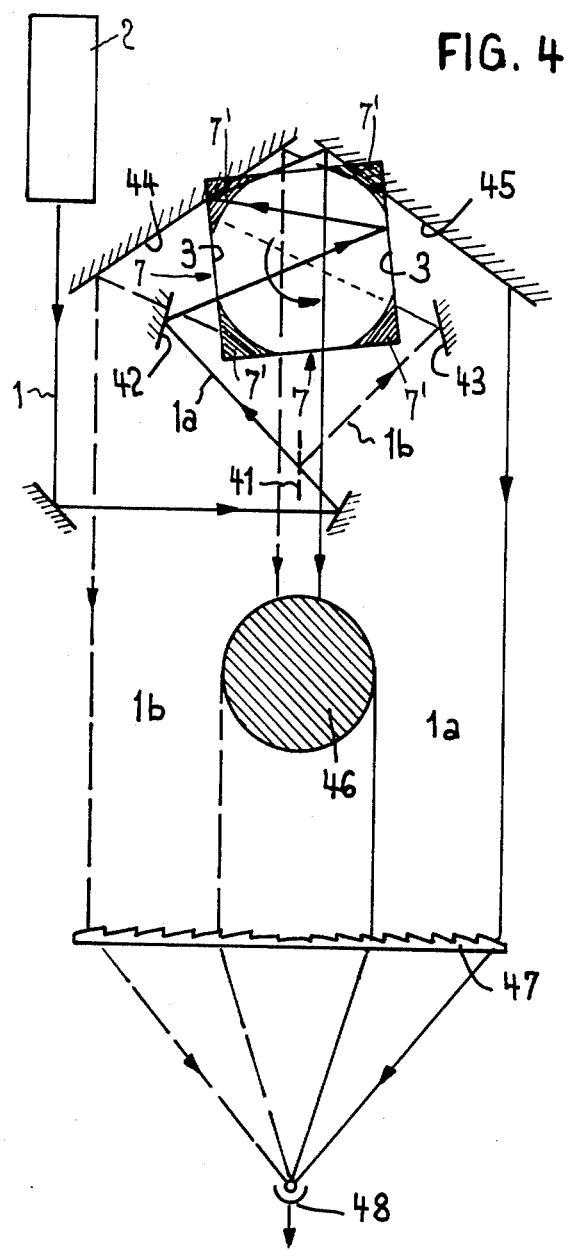

FIG. 4 shows a schematic illustration of a further example of use. The light beam 1 is split into half beams 1a and 1b by means of a half reflecting mirror 41, and conducted to the rotatable mirror system 3 by way of mirrors 42 and 43. The exiting telecentric beams extend into a measuring region by way of mirrors 44 and 45, an object 46 to be measured being located in said region. The regions of the telecentric beams lie at a known spacing from one another. The direction of entry of the half beams 1a and 1b into the mirror system 3 and the width of the windows 7 between the webs 7' are so selected that alternately in relative time displacement telecentric beams 1a or 1b enter the measuring region. It is therefore also possible, by means of one and the same collector lens 47 to project both beams onto a common photocell 48 which relays all necessary signals to the calculator. The arrangement according to FIG. 4 makes possible in relation to given dimensions of the rotatable mirror system 3 the measurement of an object twice as large as the arrangement of FIGS. 1 and 2. The device could, however, also be used for the optical measurement of smaller objects in which case the latter are located approximately in the centre of the region of one telecentric beam (1a or 1b) and the calculator is switched over to a corresponding evaluation.

Figure 5:
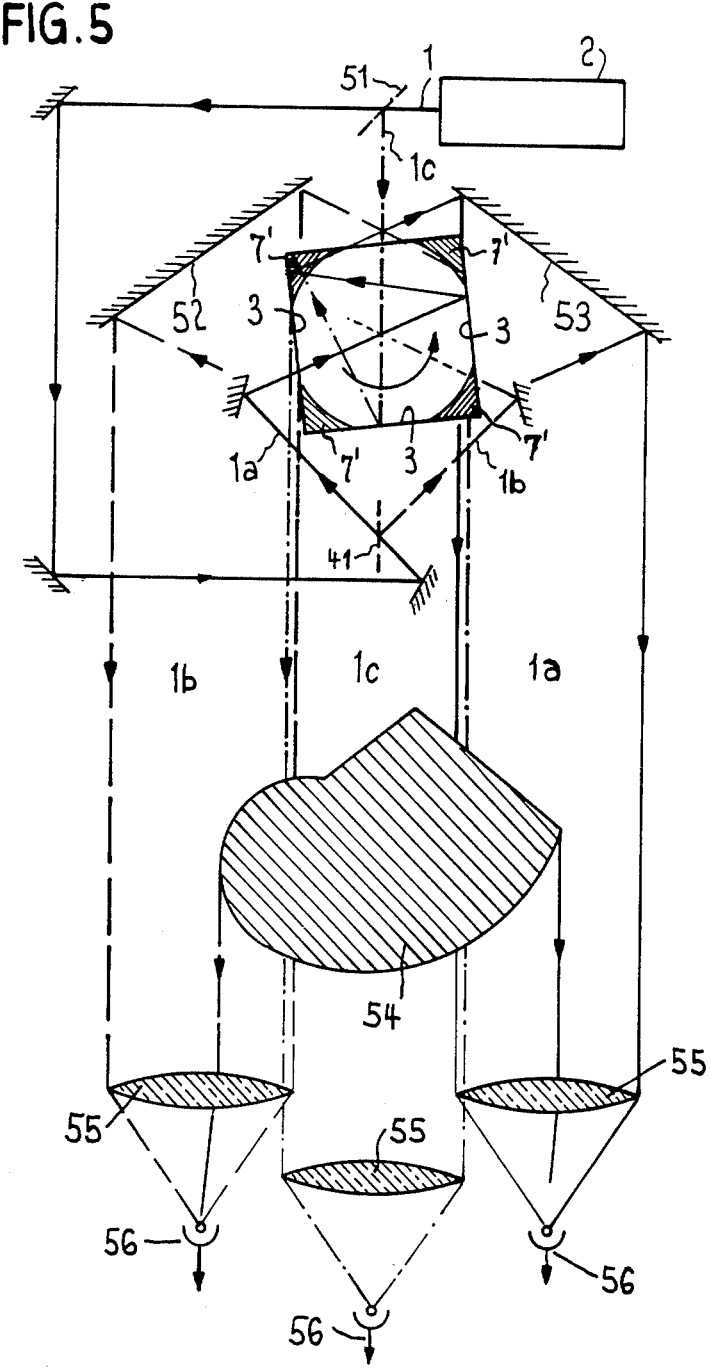

FIG. 5 shows diagrammatically a further proposal. By means of a part reflecting mirror 51 a third part of the light is projected directly into the rotatable mirror system 3 as a beam 1c. The remaining two thirds of the light passing through the mirror 51 is projected into the rotary mirror system from the front by means of a suitable arrangement essentially similar to that of FIG. 4. Telecentric beams 1a to 1c thus exit adjacent one another either directly or respectively by way of mirrors 52 and 53, whereby the measuring region in relation to the dimensions of the mirror system is tripled, thus enabling the measurement of a large object 54. If it should not be possible by means of the arrangement according to FIG. 5 to produce the telecentric beams in consecutive timed relation, a collector lens 55 and a photoelectric cell 56 can be coordinated to the region of each telecentric beam, as shown in FIG. 5.

Figure 6:
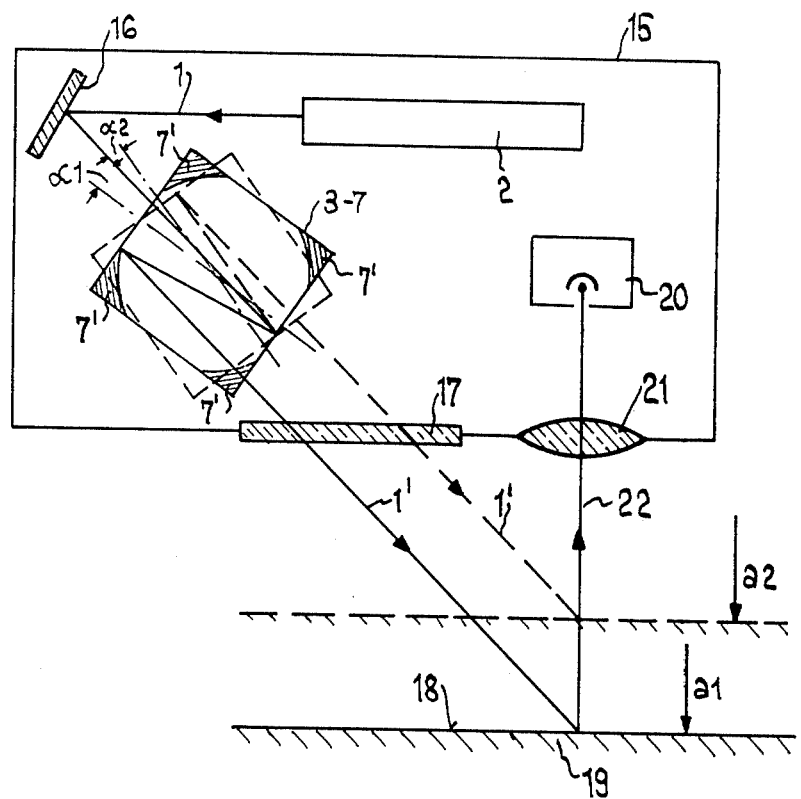

FIG. 6 shows an example of use of the diagrammatically illustrated device according to FIGS. 1 and 2 wherein corresponding parts are indicated with like reference numerals as in FIGS. 1 and 2. For the optimum utilisation of the space in a housing 15, the incident light beam passes to the rotating mirror system 3 by way of a deflecting mirror 16, and the deflected light beam 1' passes through an optical window 17 of the housing 15 to impinge at a predetermined inclination on the upper surface 18 of an object 19. An optical system 21 is arranged to cooperate with a receiver 20 arranged in the housing 15, the receiver 20 indicating when the light beam 1' impinges upon an exactly defined point on the optical axis 22. As indicated in FIG. 6, the light beam 1' reaches the said defined point on the optical axis 22 at different moments in relation to the rotation of the mirror system 3 in accordance with whether the object 19 and thus its upper surface 18 is located at a distance closer to or farther from the optical system 21. It can thus be determined from the instant or the momentary angle of rotation of the mirror system 3 at which the impingement of the light beam 1' upon the defined point of the upper surface 18 occurs what is the distance of this upper surface from the optical system 21 and thus the position of the upper surface 18 and of the object 19 is determined. The calculation of this position can be effected in simple manner by means of a calculator to which as input information is fed the rotary angle of the mirror system 3. It is thus established that the beam 1' reaches the above-mentioned point on the upper surface when at a rotary angle $\alpha 1$ or $\alpha 2$ in accordance with whether the upper surface 18 is located in the position a1 or a2. The calculator can now determine with the aid of a simple sine function in which respective position the upper surface 18 is located. From the geometric properties of the measuring device the calculator can be so programmed or set that correctly calculated measurement values are available without the need for actual calibration.

Naturally other arrangements and applications of the deflection device are possible.

For example the mirrors according to FIG. 3 or 4 could be so interchangeable that optionally two dimensions as shown in FIG. 3 or a large object as shown in FIG. 4 can be measured. The evaluation of the measurement can be effected by any known method. For example an optical raster or measuring rod can be located in the region of one or more telecentric beams, in which case the calculator determines the size and/or position of the object to be measured by means of the light impulses which appear.

I claim:

1. A device for the production of at least one telecentric light beam which is to be deflected parallel to itself through a defined region, said device comprising, a carrier;

at least one pair of plane, parallel internally directed mirrors arranged on said carrier;

means rotatably supporting said carrier on one side thereof;

window means provided in said carrier on the side thereof supported by said supporting means;

said carrier being open on the side thereof opposite from that supported by said supporting means;

and means for directing a light beam towards said carrier along a path inclined relatively to the plane of rotation of the carrier and the mirrors, whereby said light beam can pass through said carrier laterally of the mirrors by way of said window means and said open side of the carrier, being reflected within the carrier by means of said internally directed mirrors.

2. A device according to claim 1, wherein the optical axis of the said light beam directing means intersects the rotary axis of the carrier.

3. A device according to claim 1, wherein the planes of the mirrors are parallel to the axis of rotation thereof.

4. A device according to claim 1 or 3, wherein a polygonal rotatable mirror system is provided.

5. A device according to claim 4, wherein said mirror system is square.

6. A device according to claim 1, wherein said light beam directing means comprises means for directing a plurality of light beams towards the rotatable carrier from different directions, and said device further comprises fixed mirrors for reflecting the resulting telecentric light beams issuing from the carrier into different regions.

7. A device according to claim 6, wherein the arrangement is such that two of said telecentric beams are reflected back in directions at right angles to one another and cross in a measuring region.

8. A device according to claim 6, wherein the arrangement is such that two or more said telecentric beams are reflected parallel to one another into regions lying adjacent one another in order to widen the total region swept by said telecentric beams.

9. A device according to claim 6, wherein the directions of the light beams to be incident upon the rotary mirrors are so selected and the windows of the carrier are so dimensioned that the resulting telecentric beams enter two regions alternately in time-displaced relationship, and a common optical system is provided for receiving all the telecentric beams.

10. A process for measuring a dimension or position of an object comprising the steps of providing a device comprising
   a carrier;
   at least one pair of plane, parallel internally directed mirrors arranged on said carrier;
   means rotatably supporting said carrier on one side thereof;
   window means provided in said carrier on the side thereof supported by said supporting means;
   said carrier being open on the side thereof opposite from that supported by said supporting means; and
   means for directing a light beam towards said carrier along a path inclined relatively to the plane of rotation of the carrier and the mirrors, whereby said light beam can pass through said carrier laterally of the mirrors by way of said window means and said open side of the carrier, being reflected within the carrier by means of said internally directed mirrors;
   bringing said object into the defined region through which said light beam is to be deflected, whilst rotating said carrier to deflect the light beam;
   ascertaining at which point in time the light beam is located on at least one predetermined point of the object, and utilising a calculator to determine from said at least one point in time, in accordance with a simple function, the position of the light beam when located on said at least one predetermined point, and thus the dimension or the position of said object.

11. A process as claimed in claim 10, wherein said predetermined function is a sine function.

12. A process according to claim 10 or 11, wherein the light beam is directed against the upper surface of an object at a predetermined inclination thereto, and from the point in time at which the light beam passes through a predetermined point on the upper surface the position of the upper surface or the object is determined.

13. A process for measuring a dimension or position of an object comprising the steps of providing a device comprising
   a carrier;
   at least one pair of plane, parallel internally directed mirrors arranged on said carrier;
   means rotatably supporting said carrier on one side thereof;
   window means provided in said carrier on the side thereof supported by said supporting means;
   said carrier being open on the side thereof opposite from that supported by said supporting means; and
   means for directing a light beam towards said carrier along a path inclined relatively to the plane of rotation of the carrier and the mirrors, whereby said light beam can pass through said carrier laterally of the mirrors by way of said window means and said open side of the carrier, being reflected within the carrier by means of said internally directed mirrors;
   bringing said object into the defined region through which said light beam is to be deflected, whilst rotating said carrier to deflect the light beam;
   ascertaining at which angular position of the rotating carrier the light beam is located on at least one predetermined point of the object, and utilising a calculator to determine from said at least one angular position in accordance with a simple function, the position of the light beam when located on said at least one predetermined point, and thus the dimension or the position of said object.

14. A process as claimed in claim 13, wherein said predetermined function is a sine function.

15. A process according to claim 13 or 14, wherein the light beam is directed against the upper surface of an object at a predetermined inclination thereto, and from the angular position at which the light beam passes through a predetermined point on the upper surface the position of the upper surface or the object is determined.

* * * * *